(12) United States Patent
Moran et al.

(10) Patent No.: US 7,293,554 B2
(45) Date of Patent: Nov. 13, 2007

(54) IGNITION COIL DRIVER DEVICE WITH SLEW-RATE LIMITED DWELL TURN-ON

(75) Inventors: Kevin D. Moran, Trenton, MI (US); Guoming G. Zhu, Novi, MI (US); Michael T. Nation, Ypsilanti, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 71 days.

(21) Appl. No.: 11/088,292

(22) Filed: Mar. 24, 2005
(Under 37 CFR 1.47)

(65) Prior Publication Data
US 2006/0213489 A1    Sep. 28, 2006

(51) Int. Cl.
*F02P 3/04* (2006.01)

(52) U.S. Cl. .................. 123/650; 123/605; 123/618

(58) Field of Classification Search .......... 123/605, 123/609, 618, 650–654; 315/209 CD, 209 T
See application file for complete search history.

(56) References Cited

U.S. PATENT DOCUMENTS

| | | | |
|---|---|---|---|
| 3,237,620 A * | 3/1966 | Hetzler et al. ............... 123/651 |
| 3,937,193 A | 2/1976 | Kim | |
| 3,938,490 A | 2/1976 | Snyder et al. | |
| 4,095,576 A | 6/1978 | Hattori et al. | |
| 4,128,091 A | 12/1978 | Balan et al. | |
| 4,131,097 A | 12/1978 | Sawada et al. | |
| 4,154,205 A | 5/1979 | Forster | |
| 4,285,322 A * | 8/1981 | Ina et al. ..................... 123/630 |
| 4,324,216 A | 4/1982 | Johnson et al. | |
| 4,359,038 A | 11/1982 | Xiberas | |
| 4,379,444 A | 4/1983 | Weber | |
| 4,402,298 A | 9/1983 | Morita | |
| 4,403,591 A | 9/1983 | Weber | |
| 4,434,779 A | 3/1984 | Yamamoto et al. | |
| 4,446,843 A | 5/1984 | Rumbaugh et al. | |
| 4,475,520 A | 10/1984 | Toyama et al. | |
| 4,638,785 A | 1/1987 | Matsui et al. | |
| 4,649,888 A | 3/1987 | Kawai et al. | |
| 4,658,788 A | 4/1987 | Yamamoto et al. | |
| 5,309,888 A | 5/1994 | Deutsch et al. | |
| 5,404,860 A | 4/1995 | Morino | |
| 5,584,275 A * | 12/1996 | Taruya .................. 123/406.14 |
| 5,634,453 A * | 6/1997 | Taruya et al. ............... 123/645 |
| 5,781,050 A | 7/1998 | Russell | |
| 5,819,713 A | 10/1998 | Kesler | |
| 5,913,302 A | 6/1999 | Ruman et al. | |
| 5,920,166 A | 7/1999 | Schlager et al. | |
| 5,970,964 A * | 10/1999 | Furuhata et al. ............ 123/644 |
| 6,100,701 A * | 8/2000 | Hoy et al. ................... 324/546 |
| 6,257,216 B1 | 7/2001 | Forster et al. | |
| 6,305,365 B1 | 10/2001 | Macoka et al. | |
| 6,450,157 B1 | 9/2002 | Kesler et al. | |
| 6,526,953 B1 * | 3/2003 | Inagaki ....................... 123/609 |
| 6,595,192 B1 | 7/2003 | Haussmann et al. | |

(Continued)

*Primary Examiner*—Hai Huynh
(74) *Attorney, Agent, or Firm*—Brinks Hofer Gilson & Lione

(57) ABSTRACT

A device to control the charging rate of an ignition coil for an internal combustion spark ignition engine. The device controls the turn-on rate of the primary coil by slew-rate limiting using switching devices and a Miller-effect capacitor in order to reduce secondary oscillation magnitudes originated by a sharp transition of the controlling switch.

11 Claims, 4 Drawing Sheets

U.S. PATENT DOCUMENTS

| | | |
|---|---|---|
| 6,629,520 B2 * | 10/2003 | Inagaki et al. ............... 123/618 |
| 6,684,867 B2 * | 2/2004 | Ito et al. ..................... 123/644 |
| 6,717,412 B1 | 4/2004 | Moritz et al. |
| 6,814,066 B2 * | 11/2004 | Ando ......................... 123/644 |
| 6,997,171 B1 * | 2/2006 | Naruse et al. ............... 123/609 |
| 7,046,051 B2 * | 5/2006 | Melbert et al. ............. 327/110 |
| 7,051,724 B2 * | 5/2006 | Uruno et al. ................ 123/644 |
| 7,080,639 B1 * | 7/2006 | Pattantyus ................... 123/651 |
| 7,100,589 B2 * | 9/2006 | Toriyama ..................... 123/604 |
| 2005/0263144 A1 * | 12/2005 | Toriyama ..................... 123/604 |

\* cited by examiner

IGNITION COIL DRIVER DEVICE WITH SLEW-RATE LIMITED DWELL TURN-ON

BACKGROUND

1. Field of the Invention

The present invention generally relates to a circuit for driving a flyback transformer, also referred to as an ignition coil, of a spark ignited internal combustion engine. More specifically it is related to controlling the turn-on rate of the ignition coil.

2. Description of Related Art

In a spark ignited internal combustion engine, ignition coils provide the voltage required for electrical current to jump across a spark plug gap, igniting an air-fuel mixture in the engine cylinder causing combustion. A switch, also referred to as a coil driver, is used on the primary side of the ignition coil to control the charge and discharge cycles of the ignition coil.

A typical ignition system is illustrated in FIG. 1. The system includes an ignition coil 10 having a primary side 16 and a secondary side 18. The positive terminals of the primary side 16 and secondary side 18 of the ignition coil 10 are connected to a power source 12. The negative terminal of the primary side is connected to a switching transistor 14. The switching transistor 14 is connected between the ignition-coil 10 and an electrical ground 20. The negative terminal of the secondary side 18 is connected to a spark plug 22. The spark plug 22 is connected between the ignition coil 10 and an electrical ground 20.

FIG. 2 illustrates the voltage and current profiles at various points within the system. The profile of the control signal provided to the switching transistor 14 is identified by reference numeral 24. The current flowing through the primary side 16 of the ignition coil 10 is denoted by reference numeral 26. In addition, a profile of the primary coil voltage signal, as seen on the collector of transistor 14, is denoted by reference numeral 28. In a typical charge and discharge cycle the switching transistor 14 is turned on, charging the ignition coil 10 for a specified dwell period or to a specified charge current; and then the switching transistor 14 is turned off, allowing the secondary side 18 of the ignition coil 10 to discharge stored energy across the spark plug gap.

One problem is that the sharp turn-on during the charging cycle causes an oscillation on the secondary side 18 of the ignition coil 10. FIG. 3 illustrates the dwell command signal 24, the dwell current 26, the primary side (low-side) voltage 28, and the undesirable secondary voltage oscillation 30. The switching transistor 14 starts out in the off-state with the negative terminal of the primary side 16 equal to the battery voltage. After the switching transistor 14 is turned on, the transistor quickly transits through its linear range into the saturated on-state with a very large rate of voltage change across the primary side 16 of the ignition coil 10. The resulting secondary voltage 30 during turn-on is a large oscillation magnitude that decays over time. If the oscillation magnitude exceeds a tolerable level, an unintended spark event can occur across the spark plug gap, resulting in premature combustion. One way to control the magnitude of the secondary oscillations is adding constraints in design of the ignition coil 10 resulting in poor coil performance.

In view of the above, it is apparent that there exists a need for an ignition coil driving circuit with an improved ignition control.

SUMMARY

In satisfying the above need, as well as overcoming the enumerated drawbacks and other limitations of the related art, the present invention provides a circuit for driving an ignition coil with soft turn-on.

Soft turn-on is another method for controlling the magnitude of the secondary oscillations. Soft turn-on includes shaping the turn-on rate during the dwell period. The circuit implements voltage slew-rate limiting across the ignition coil primary during the beginning of the dwell period; and disables the voltage slew-rate limiting at the end of the dwell period. A miller-effect capacitor is used for slew-rate limiting; along with transistors and diodes to switch the miller-effect capacitor into the circuit during turn-on and out of the circuit during turn-off.

The circuit for driving the ignition coil includes a first transistor, a second transistor and a capacitor. The first transistor is connected in electrical series with the ignition coil and the second transistor is connected to the control input of the first transistor. A capacitor is connected between the first transistor's collector and a control input of the second transistor thereby functioning as a Miller-effect capacitor. The first and second transistors amplify the capacitive effect of the capacitor while both transistors are operating in the linear region. Since the slew-rate needs to be limited during turn-on, but cannot be limited during turn-off because of the effect on the secondary voltage and spark; additional circuitry must be added. A first diode couples the capacitor with the transistor control during turn-on and isolates it during turn-off. A second diode and resistor provide a discharge path for the capacitor during turn-off.

A specific impedance is maintained at the gate of the main switching transistor during primary turn-off to maintain proper flyback voltage regulation. A zener diode and resistors provide a current path when the flyback voltage at the collector of first transistor exceeds a desired value, limiting the flyback voltage.

With the proposed soft turn-on, the first transistor transits to its saturated state through the linear range at a significantly slower rate greatly reducing the rate of voltage change across the coil primary. The secondary voltage oscillation magnitude is greatly reduced.

Further objects, features and advantages of this invention will become readily apparent to persons skilled in the art after a review of the following description, with reference to the drawings and claims that are appended to and form a part of this specification.

DETAILED DESCRIPTION

Figure 4:
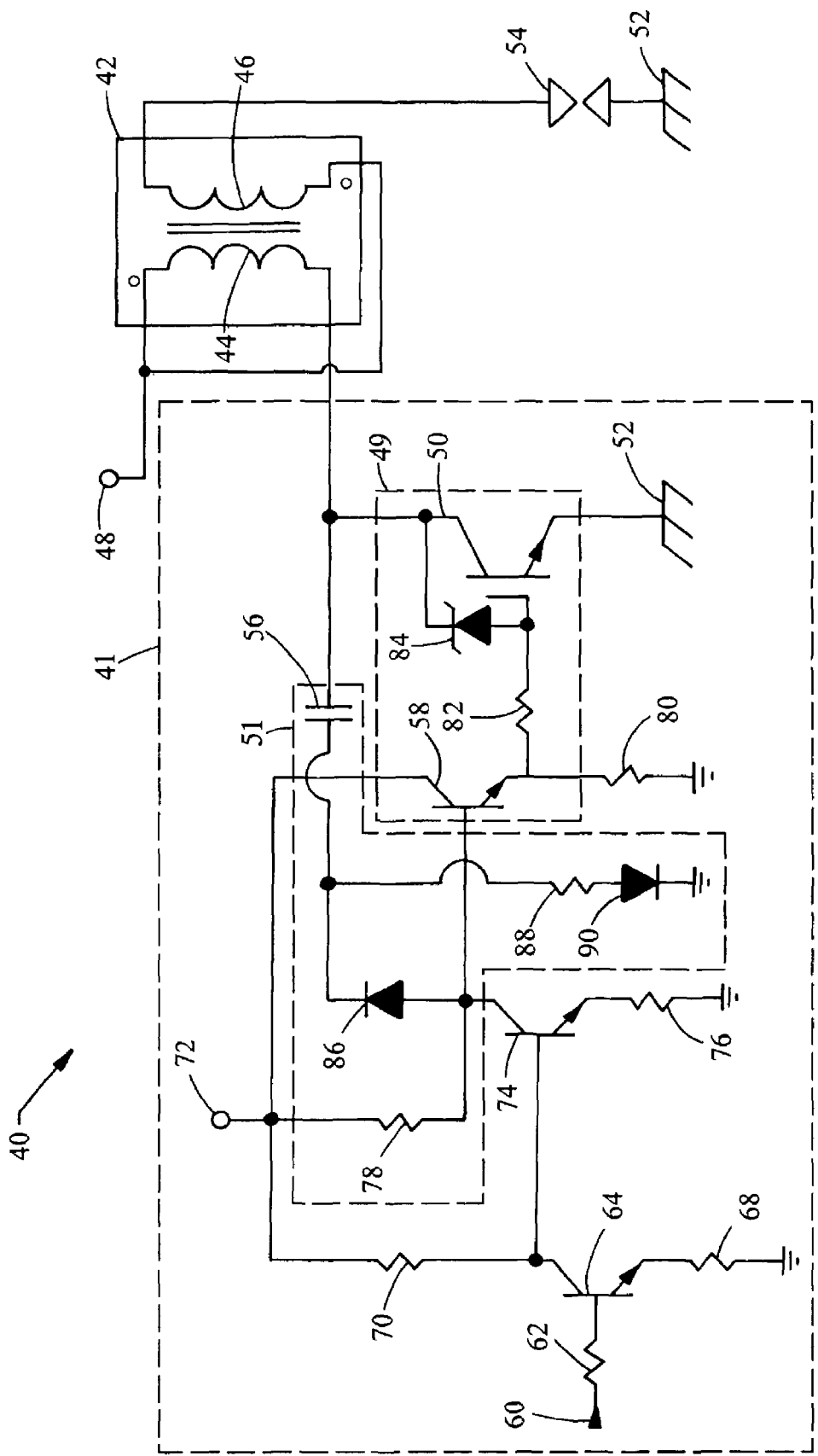
FIG. 4 is a schematic view of a circuit for driving an ignition system in accordance with the present invention.

A system embodying the principles of the present invention is illustrated in FIG. 4 and designated at 40. The system 40 includes an ignition coil 42, spark plug 54, and a circuit 41 including a switching portion 49 and a rate limiting portion 51.

The switching portion 49 can be implemented on the high-side of the primary or on the low-side. A low-side driver implementation will be illustrated for discussion purposes; however the same principles can be applied to a high-side driver.

Ignition coil 42 includes a primary side 44 and a secondary side 46. The positive terminals of the primary side 44 and secondary side 46 are connected to a power source 48, generally the automotive battery. The negative terminal of the primary side 44 of the ignition coil 42 is connected to a switching portion 49 of the circuit 41. For the embodiment shown in FIG. 4, the switching portion 49 includes a first transistor 50 and a second transistor 58. The first transistor 50 is shown as an IGBT (Insulated Gate Bipolar Transistor) and is the main switching transistor implemented on the low-side negative terminal of the primary side 44 of the ignition coil 42. The first transistor 50 is configured to selectively connect the negative terminal of the ignition coil 42 to an electrical ground 52 allowing current to flow through the primary side 44 of the ignition coil 42. When commanded, the first transistor turns on, allowing current to begin flowing through the primary side 44 of the ignition coil 42. The rate of change of current (di/dt) is established by the Voltage (V) across and inductance (L) of the primary side 44 of the ignition coil 42; and defined by the equation $$\frac{di}{dt} = \frac{V}{L}.$$

The energy stored (E) due to the current (i) through and inductance (L) of the primary side 44 of the ignition coil 42 is defined by the equation $E=i^2*L$. When the current (i) through the primary side 44 of the ignition coil 42 reaches a level such that enough energy (E) is stored, the command is turned off shutting off the first transistor 50. When the first transistor 50 is shut off, the energy (E) stored in the primary side 44 of the ignition coil 42 is transferred to the secondary side 46 of the ignition coil 42, resulting in a high voltage and current flow across the spark plug 54 gap.

Zener diode 84 is connected between the gate and the collector of the first transistor 50. Zener diode 84 may be the intrinsic diode of an IGBT package for the first transistor 50. The Zener diode 84 limits the flyback voltage at the negative side of the primary side 44 of the ignition coil 42 by providing a current path through Zener diode 84, and resistors 80 and 82 when the first transistor 50 is commanded off and the flyback voltage exceeds the desired level.

The circuit 41 also has a rate limiting portion 51. The rate limiting portion 51 is in electrical communication with the switching portion and is configured to limit the transition time as the switching portion 49 transitions from a non-conducting to a fully conducting mode. The rate limiting portion 51 includes a capacitor 56. A first side of the capacitor 56 is connected to the collector of the first transistor 50, while the second side of capacitor 56 is connected through diode 86 with the base of a second transistor 58. The emitter of the second transistor 58 is connected to the gate of the first transistor 50 through resistor 82, and to ground through resistor 80. Since the gate of the first transistor 50 is very high impedance, the current flowing into this gate can be neglected. So that the current through the resistor 82 can also be considered to be zero; except when Zener diode 84 is conducting (immediately following the first transistor 50 shutting off and flyback Voltage is present in the primary side 44 of the ignition coil 42).

Figure 5:
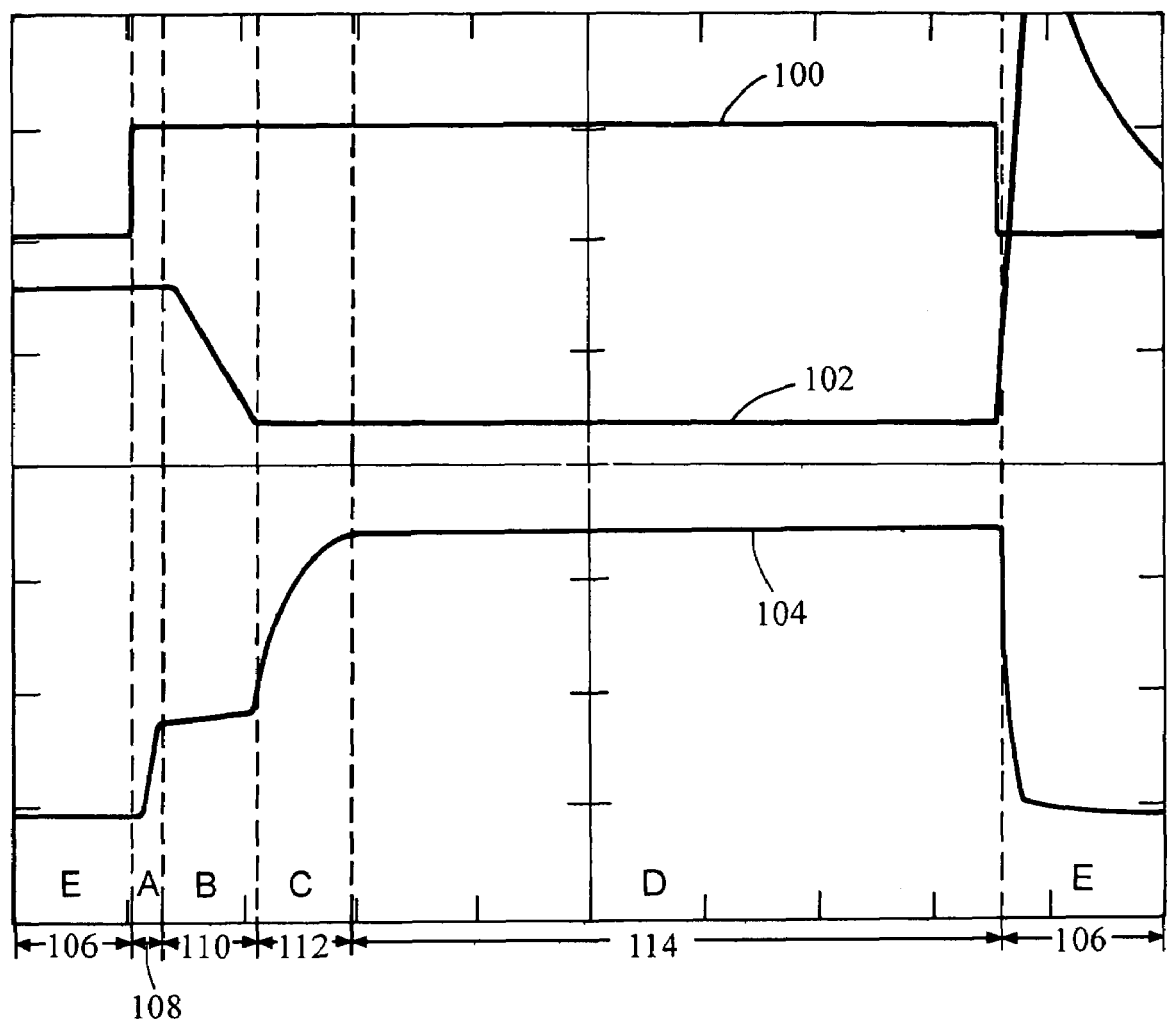
FIG. 5 is a graph illustrating the timing of various voltage profiles for a circuit in accordance with the present invention.

The first transistor 50 is operated in three modes—cutoff, linear, and saturation. Waveforms illustrating the three states of the first transistor 50 are shown in FIG. 5. The first transistor 50 is operated in the cutoff mode in regions 106 and 108, in linear mode in region 110 when slew-rate limiting is needed, and in saturation mode in regions 112 and 114. The voltage of the dwell control pulse is denoted by reference numeral 100. The voltage at the negative terminal of the primary side 44 of the ignition coil 42 is denoted by reference numeral 102. The gate voltage of the first transistor 50 is denoted by reference numeral 104. The collector voltage 102 of the first transistor 50, or primary low-side voltage, starts out at the battery voltage when the dwell control 100 and gate voltage 104 of the first transistor 50 are both zero. When the dwell control 100 goes high, the gate voltage 104 of the first transistor 50 quickly increases to where the first transistor 50 just begins to conduct and enters the linear region. The gate voltage 104 of the first transistor 50 slowly increases through the linear range and the primary low-side voltage 102 linearly decreases until it reaches the saturation voltage of the first transistor 50. Once the first transistor 50 reaches saturation, the gate voltage 104 increases, keeping the first transistor 50 in the saturation mode. At the end of the dwell control 100 pulse the gate voltage 104 goes to zero cutting off the first transistor 50 and the primary low-side voltage 102 quickly becomes very large due to the ignition coil inductive flyback. The magnitude of the flyback voltage is determined by the zener diode 84 and the resistors 80 and 82

The capacitor 56 is known as a Miller-effect capacitor and is the key to be able to transit the gate voltage quickly from the off state to the start of the linear range, slowly through the linear range, and quickly again after saturation is reached. The Miller-effect is achieved by placing a capacitor between the input and output of an inverting amplifier; resulting in $C_{Effective}=C_{Miller}*[1+K]$ where K is the gain of the inverting amplifier. Although the first transistor 50 is an inverting amplifier, capacitor 56, the Miller-effect capacitor, cannot be applied directly from the gate to the collector. This is because the capacitor 56 needs to be switched out during turn-off when diode 84 needs to be biased correctly using resistor 80 and resistor 82 in order to regulate the coil's flyback voltage. Therefore, a second transistor 58 is added and capacitor 56 is place from the base of the second transistor 58 to the collector of the first transistor 50 resulting in the Miller-effect when, and only when, both the second transistor 58 and the first transistor 50 are operating in the linear range. Furthermore, a diode 86 is added between the base of the second transistor 58 and the Miller-effect capacitor 56 so that the capacitance of capacitor 56 is only seen during the dwell-on phase 108, 110, 112, and 114, and is isolated from the switching circuit during the dwell-off phase 106. The resistor 88 and diode 90 provide the discharge path for the capacitor 56 during the dwell-off phase 106.

To control the first and second transistor 50, 58 thereby charging and discharging of capacitor 56, a dwell control input circuit is provided. A dwell control signal is provided to an input node 60. The dwell control signal for the ignition dwell period is generated by a controller that is synchronized with the engine crankshaft and camshaft positions. Typically this is done using the vehicle's Powertrain Control Module (PCM). For this embodiment, the control signal is defined as 0 Volts outside of the dwell period and a positive voltage during the dwell period. The dwell control voltage is provided for reference and denoted by reference numeral 100.

Resistor 62 is connected between the input node 60 and a base of a third transistor 64. The emitter of the third transistor 64 is connected to an electrical ground through resistor 68. The collector of the third transistor 64 is connected to the base of a fourth transistor 74. In addition, the collector of the third transistor 64 is connected to a voltage source 72 through resistor 70. The emitter of the fourth transistor 74 is connected to an electrical ground through resistor 76. The collector of the fourth transistor 74 is connected to the base of the second transistor 58. In addition, the base of the second transistor is connected to the power source 72 through resistor 78. The collector of the second transistor 58 is connected to the voltage source 72, while the emitter of the second transistor 58 is connected to an electrical ground through resistor 80. In addition, the emitter of the second transistor 58 is connected with the gate of the first transistor through a resistor 82. The first side of capacitor 56 is connected to the collector of the first transistor 50, the cathode of the Zener diode 84 and the negative of the primary side 44 of the ignition coil 42. The second side of capacitor 56 is connected to a cathode of diode 86. The anode of diode 86 is connected to the base of the second transistor 58.

In addition, the second side of capacitor 56 is connected to ground through resistor 88 and diode 90. The cathode of diode 90 is connected to ground. The anode of diode 90 is connected to the first side of resistor 88 and the second side of resistor 88 is connected to the second side of capacitor 56.

To control the first transistor 50 as required, a series of transistors and diodes are used between the input node 60 and the gate of the first transistor 50 along with capacitor 56. A third transistor 64 and fourth transistor 74 are switching transistors which operate in only in the cut-off and saturation regions. The following table lists the states of the third and fourth transistors 64, 74 in relation to the state of dwell control.

| Dwell Control | Transistor 64 | Transistor 74 |
|---|---|---|
| Off (low) | Cut-Off | Saturated |
| On (high) | Saturated | Cut-Off |

When dwell control 24 is off, fourth transistor 74 is saturated keeping first and second transistor 58, 50 off. When dwell control 24 is turned on, the fourth transistor 74 turns off allowing the base voltage of the second transistor 58 to start increasing as current flows from a voltage source 72 through resistor. When the base Voltage of the second transistor 58 reaches a level where it begins to conduct, the emitter current flows through resistor 80. Since the zener diode 84 is not conducting at this time, and the gate of the first transistor 50 is sufficiently high so that the current into the gate can be neglected; it can be considered that no current flows through resistor 82 and the gate Voltage of the first transistor 50 is equal to the emitter Voltage of the second transistor 58. The gate Voltage of the first transistor 50 is designated by reference numeral 104 in FIG. 4. The first transistor gate Voltage 104 through four charge rate regions while dwell control is on; these regions are labeled 108, 110, 112, and 114 in FIG. 4.

In region 108 both the first transistor 50 and the second transistor 58 start out in cut-off mode; the base voltage of the second transistor 58 increases and starts turning the second transistor 58 on; as the second transistor 58 begins to turn on and the voltage at the gate of the first transistor 50 starts to increase. The time that it takes to move through region 108 is determined by the time constant $\tau=R*Cm$ where R is the resistance of resistor 78 and Cm is the capacitance of capacitor 56.

When the gate voltage of the first transistor 50 reaches the level where the first transistor 50 begins to turn on region 110 is entered. The first transistor 50 and the second transistor 58 are both operating in the linear mode and become an inverting amplifier. The collector voltage of the first transistor 50 begins to drop and the Miller-effect becomes active. The time that it takes to move through region 110 is determined by the time constant $\tau=R*Cm*[1+K]$, where K is the gain of the inverting amplifier.

When the collector voltage of the first transistor 50 drops to the point where the first transistor 50 becomes saturated the inverting amplifier no longer exists, therefore, region 112 is entered and the time constant becomes $\tau=R*Cm$ again. During region 112 the base voltage of the second transistor 58 continues to rise until the second transistor 58 becomes saturated.

In region 114 both the first transistor 50 and the second transistor 58 are saturated, and capacitor 56 is totally charged. In region 114 the circuit is in a steady-state condition. When K is sufficiently large, the time constant in regions 108 and 112 are much smaller than in region 110. If the Miller effect is not used, large, often unpredictable delays occur before current begins to flow in the coil's primary winding. The delay is a result of a large RC time constant in effect while the base and gate voltages of the first transistor 50 and the second transistor 58 transition to linear mode levels.

Diodes 86 and 90 are used for switching the capacitor 56 in and out when the state of the dwell control pulse changes state. When dwell control switches high, the fourth transistor 74 switches off. Diode 86 is forward biased and current can flow thereby charging capacitor 56 and providing soft turn-on. When dwell control is switched low, the fourth transistor 74 switches on. Diode 86 is now reverse biased and capacitor 56 does not effect the turn-off of the second transistor 58 so secondary energy is not lost during the spark event. Capacitor 56 discharges through resistor 88 and diode 90. Resistor 88 needs to be selected such that it is sufficiently large to limit the current through diode 90 when diode 86 is forward biased, and sufficiently small to discharge capacitor 86 during the smallest possible dwell control off time.

Figure 1:
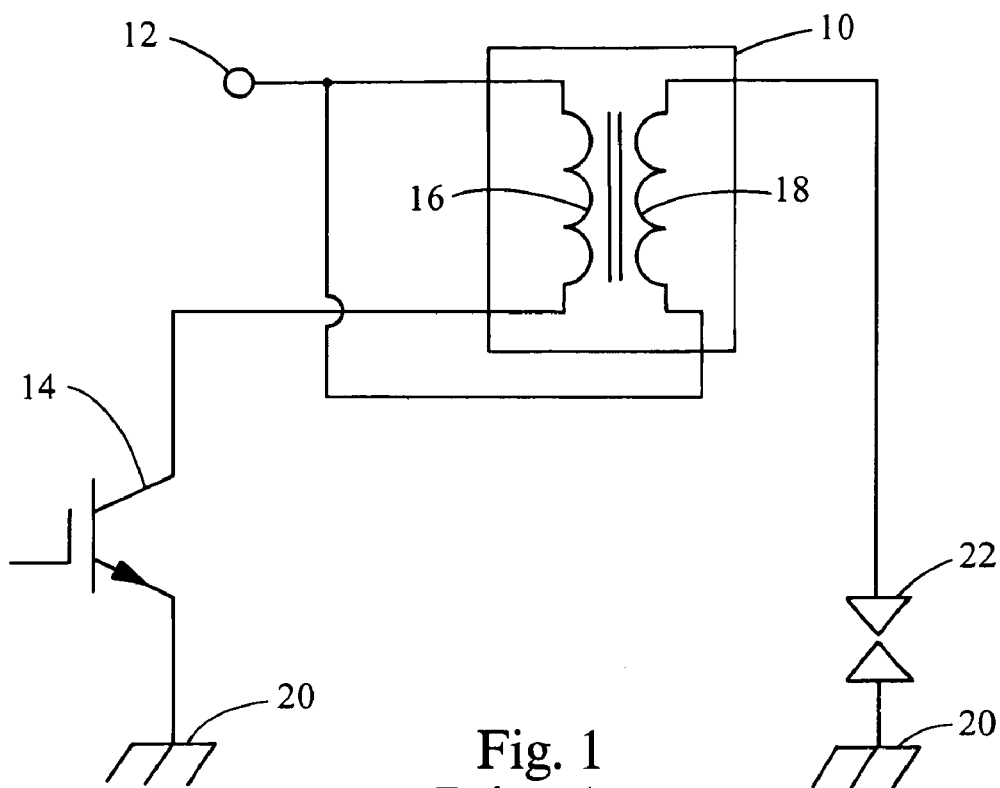
FIG. 1 is a schematic view of a typical spark ignition system.
Figure 2:
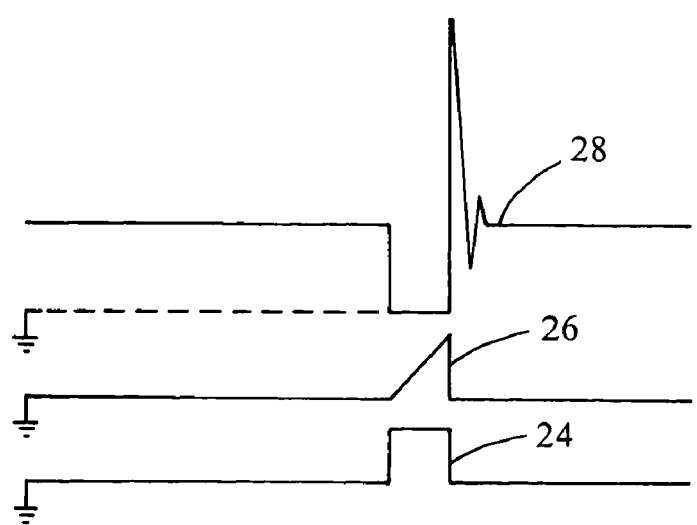
FIG. 2 is a graph illustrating the timing of various voltage profiles for a typical spark ignition system.
Figure 3:
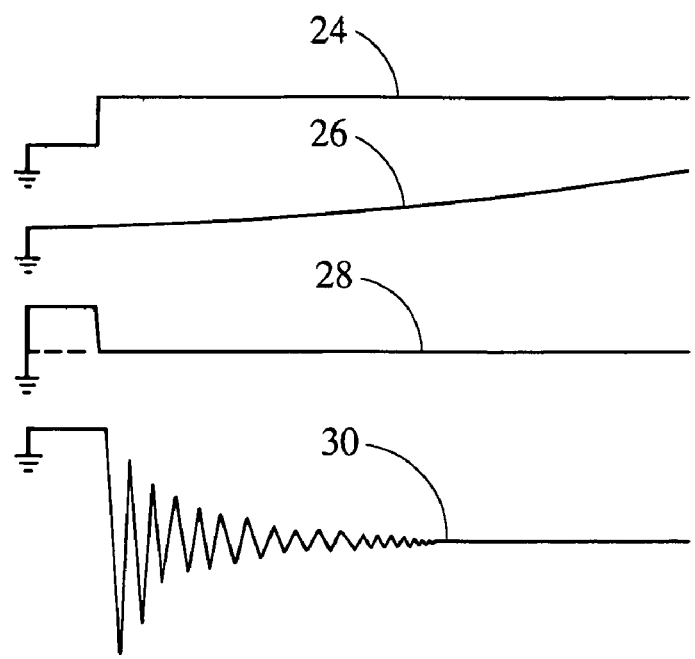
FIG. 3 is a graph illustrating undesirable oscillation in the secondary voltage resulting when soft turn-on is not implemented.
Figure 6:
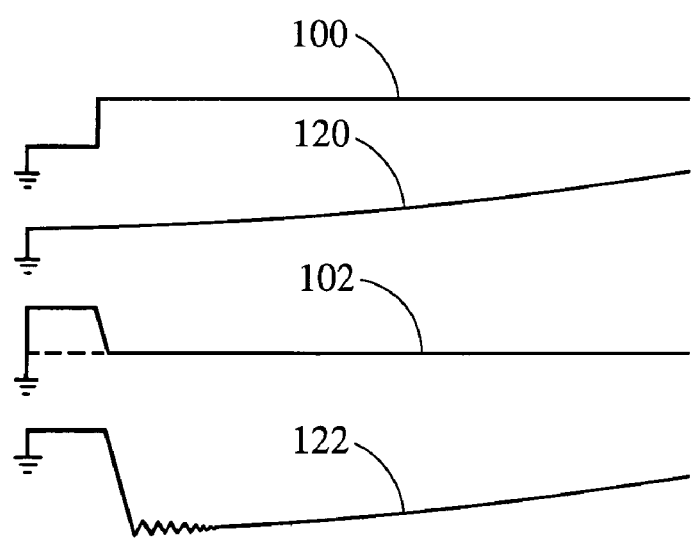
FIG. 6 is a graph illustrating significantly reduced oscillation in the secondary voltage when soft turn-on is implemented.

FIG. 6 illustrates the reduced oscillation in the secondary voltage 122 when using soft turn-on. Also, when comparing FIGS. 3 and 6, note the reduced oscillation in the dwell current 120 and the shallower slope in the primary low-side voltage 102 when soft turn-on is used. Since the ignition coil has very high inductance, the current through the coil primary cannot change instantaneously in time, and since the soft turn-on occurs early in the dwell period when the current is low, the primary current and dwell time are not significantly impacted.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A circuit for driving an ignition coil, the circuit comprising:
    a switching portion in electrical communication with the ignition coil for providing a current path; and
    a rate limiting portion in electrical communication with the switching circuit, the rate limiting portion being configured to control a voltage transition time as the switching portion transitions from a non-conducting mode to a fully conducting mode, wherein the switching portion includes:
        a first transistor connected in electrical series with the ignition coil;
        a second transistor connected to the control input of the first transistor;
        a capacitor connected in electrical series between the switched side of the ignition coil and the control input of the second transistor; and
        a diode connected in series between the control input of the second transistor and the capacitor to isolate the control input of the second transistor from the capacitor as the first transistor transitions from a fully conducting to a non-conducting mode.

2. The circuit according to claim 1, further comprising, a second diode and a resistor, the second diode being connected between a control input of the first transistor and the ignition coil, and the resistor is connected between the control input of the first transistor and a voltage reference.

3. The circuit according to claim 1, wherein a resistor and a second diode are in electrical communication with the capacitor to provide a discharge path for the capacitor after first transistor transitions to a non-conducting mode.

4. A circuit for driving an ignition coil, the circuit comprising:
    a first transistor connected in electrical series with the ignition coil;
    a second transistor connected to a controlled input of the first transistor; a capacitor connected between an output of the first transistor and a control input of the second transistor, wherein the first transistor is connected to the ignition coil and a first side of the capacitor; and
    a diode connected in series between a second side of the capacitor and the control input of the second transistor.

5. The circuit according to claim 4, wherein the second transistor is configured to amplify the capacitive effect of the capacitor while the first transistor operates in a linear region.

6. The circuit according to claim 4, further comprising a second diode and a resistor, the second diode and the resistor being connected between the capacitor and a reference voltage to discharge the capacitor.

7. The circuit according to claim 4, wherein the diode is connected between the ignition coil and a control input of the first transistor.

8. The circuit according to claim 7, wherein a resistor is connected between the control input of the first transistor and a voltage reference.

9. The circuit according to claim 4, wherein the first transistor is configured to create a voltage at the ignition coil based on a time constant $\tau$ where $\tau=R*Cm$, while the first transistor operates in a cutoff region, where R is the resistance of the resistor, and Cm is the capacitance of the capacitor.

10. The circuit according to claim 4, wherein the first transistor is configured to provide a voltage to the ignition coil based on a time constant $\tau$ where $\tau=R*Cm*[1+K]$, while the first transistor operates in a linear region, where R is the resistance of the resistor, Cm is the capacitance of the capacitor, and K is the inverting gain provided by the first and second transistor.

11. The circuit according to claim 4, wherein the first transistor is configured to provide a voltage to the ignition coil based on a time constant $\tau$ where $\tau=R*Cm$, while the first transistor operates in a saturation region where R is the resistance of the resistor, and Cm is the capacitance of the capacitor.

* * * * *